(12) United States Patent
Rosenberry et al.

(10) Patent No.: US 9,641,730 B2
(45) Date of Patent: May 2, 2017

(54) ORBITING CAMERA MOUNT WITH COUNTERWEIGHT

(71) Applicant: OrcaVue, LLC, Silver Spring, MD (US)

(72) Inventors: Daniel Rosenberry, Ashton, MD (US); Jonathan Rosenberry, Ashton, MD (US)

(73) Assignee: ORCAVUE, LLC, Silver Spring, MD (US)

(*) Notice: Subject to any disclaimer, the term of this patent is extended or adjusted under 35 U.S.C. 154(b) by 0 days.

(21) Appl. No.: 14/996,552

(22) Filed: Jan. 15, 2016

(65) Prior Publication Data

US 2016/0219192 A1 Jul. 28, 2016

Related U.S. Application Data

(60) Provisional application No. 62/106,815, filed on Jan. 23, 2015.

(51) Int. Cl.
| | | |
|---|---|---|
| *H04N 5/225* | (2006.01) | |
| *F16M 11/10* | (2006.01) | |
| *F16M 11/20* | (2006.01) | |
| *F16M 11/28* | (2006.01) | |
| *F16M 13/00* | (2006.01) | |
| *G03B 17/56* | (2006.01) | |
| *G03B 37/02* | (2006.01) | |
| *H04N 5/222* | (2006.01) | |
| *F16M 11/18* | (2006.01) | |

(52) U.S. Cl.
CPC .......... *H04N 5/2251* (2013.01); *F16M 11/10* (2013.01); *F16M 11/18* (2013.01); *F16M 11/2064* (2013.01); *F16M 11/28* (2013.01); *F16M 13/00* (2013.01); *G03B 17/561* (2013.01); *G03B 37/02* (2013.01); *H04N 5/222* (2013.01); *F16M 2200/041* (2013.01)

(58) Field of Classification Search
None
See application file for complete search history.

(56) References Cited

U.S. PATENT DOCUMENTS

| | | | | |
|---|---|---|---|---|
| 2,140,602 A | * | 12/1938 | Simjian ................. | G03B 19/023 33/17 R |
| 2,448,084 A | * | 8/1948 | Davis .................... | G03B 35/04 355/55 |
| 3,690,242 A | * | 9/1972 | Cruickshank .......... | G03B 15/00 355/48 |
| 4,236,795 A | * | 12/1980 | Kephart ................. | G03B 15/06 396/3 |
| 4,372,659 A | * | 2/1983 | Ogawa ................... | G03B 37/02 396/24 |
| 2015/0282714 A1 | * | 10/2015 | Mueller ................. | H04N 5/225 348/37 |

* cited by examiner

*Primary Examiner* — Timothy J Henn

(74) *Attorney, Agent, or Firm* — Mannava & Kang, P.C.; Carol L. Bunner

(57) ABSTRACT

An apparatus for generating, capturing, and/or recording an image having a platform assembly having a top plate coupled to a rod coupled to a base plate; and a recording assembly having a pivoting arm, a balancing arm, and pipe having a bore, wherein the pivoting arm is connected to the pipe, and the balancing arm is connected to the pipe opposite the pivoting arm; wherein the recording assembly rotates independently of the platform assembly is disclosed. Also disclosed herein is a method for generating, capturing and/or recording an image.

18 Claims, 5 Drawing Sheets

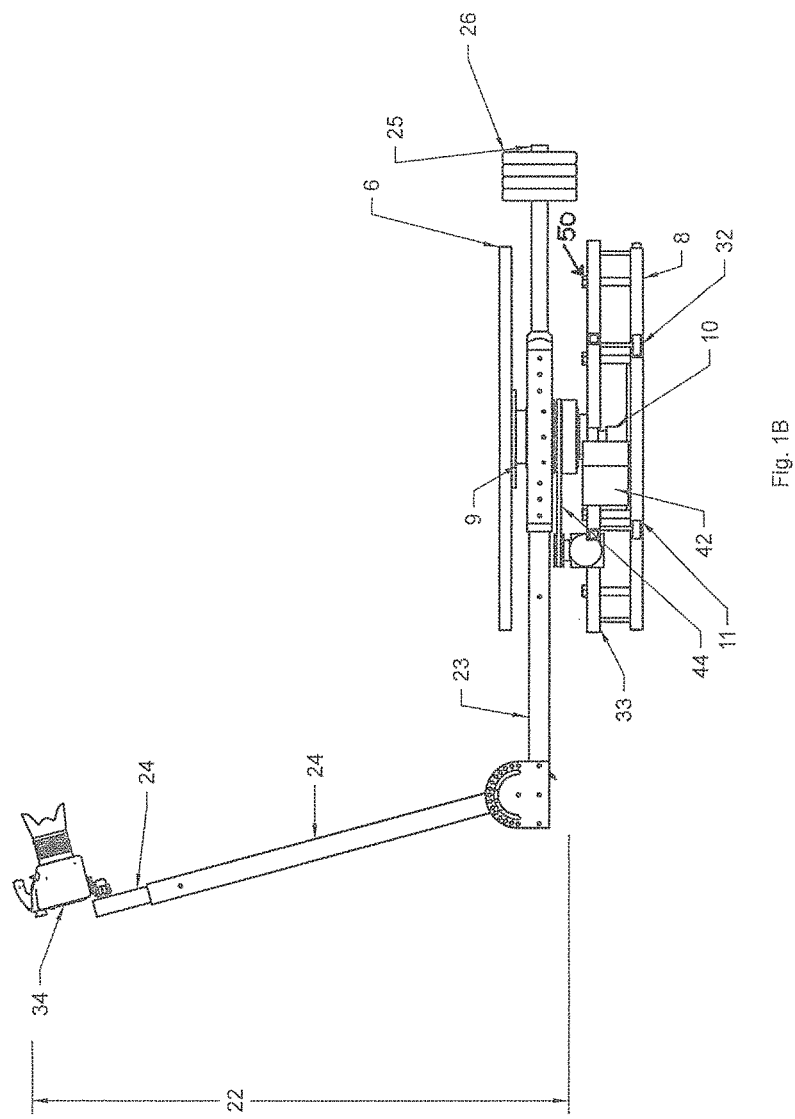

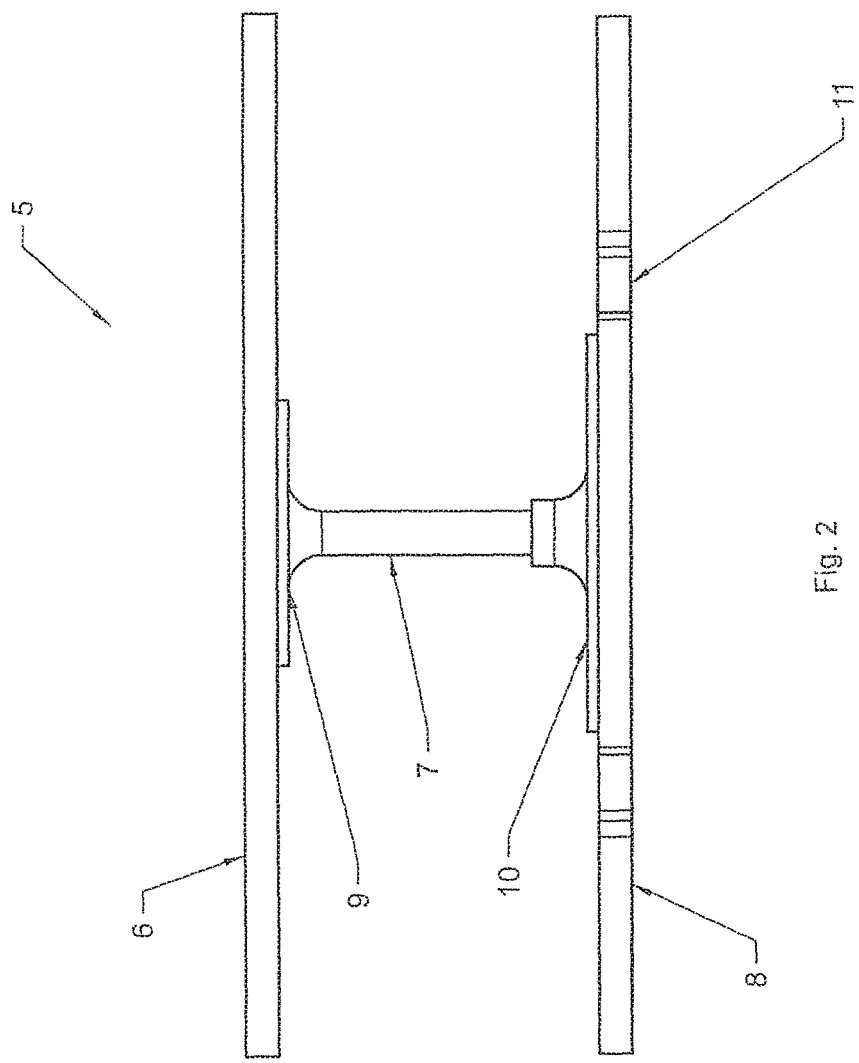

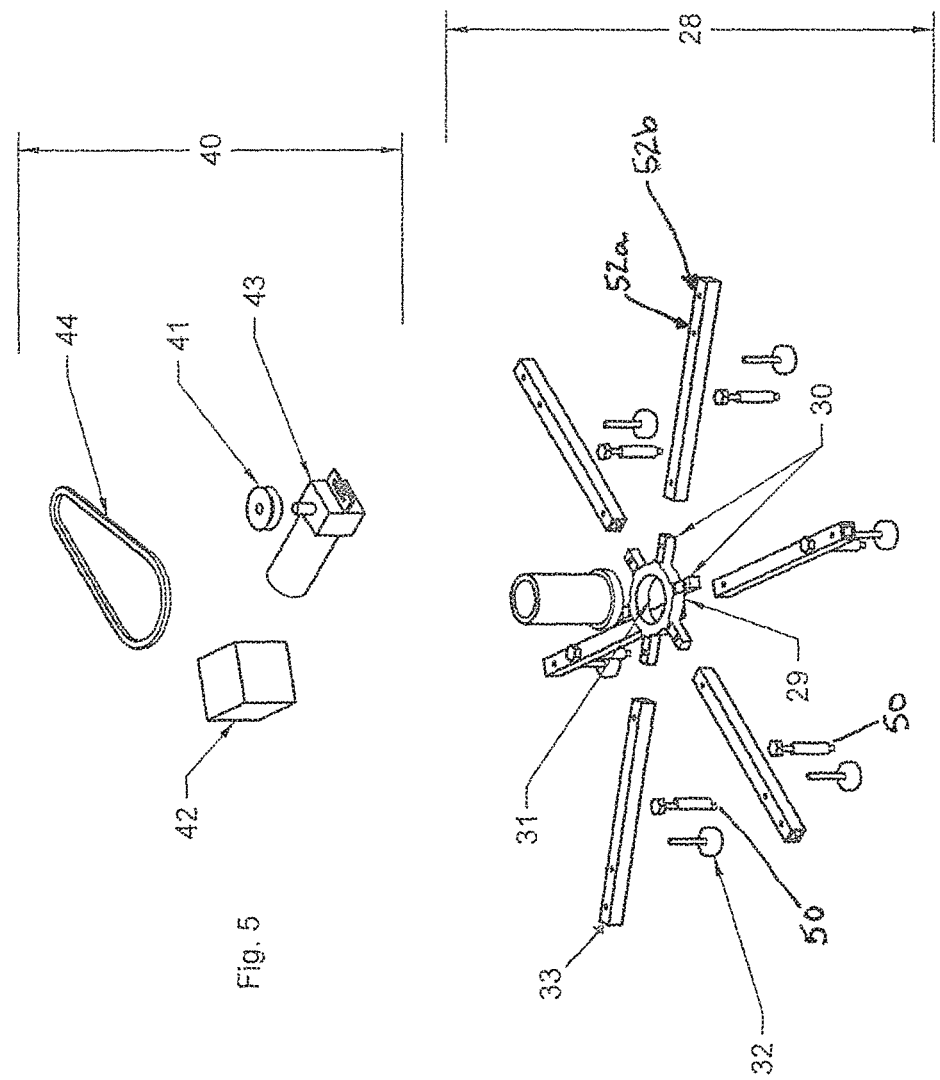

ORBITING CAMERA MOUNT WITH COUNTERWEIGHT

CROSS-REFERENCE TO RELATED APPLICATION

This application claims priority to U.S. Provisional Patent Application No. 62/106,815, filed Jan. 23, 2015, the disclosure of which is hereby incorporated by reference in its entirety.

BACKGROUND OF THE DISCLOSURE

Technical Field

Conventional methods of filming a stationary person or object, where multiple cameras or imaging devices surround the object of interest, require significant equipment setup and planning. This limits the ability to capture this unique film effect in a cost effective and timely manner. It is apparent that a need exists for a portable device capable of capturing this desired film effect, without the need for extensive setup, planning, and a large budget.

SUMMARY OF SOME EXEMPLIFYING EMBODIMENTS

In one embodiment, there is disclosed a platform assembly having a top plate coupled to a rod coupled to a base plate; and a recording assembly having a pivoting arm, a balancing arm, and pipe having a bore, wherein the pivoting arm is connected to the pipe, and the balancing arm is connected to the pipe opposite the pivoting arm; wherein the recording assembly rotates independently of the platform assembly.

In another embodiment, there is disclosed method for capturing an image, comprising providing power to a power assembly comprising at least one of a power source, a drive mechanism, a pulley, and a belt; wherein the power assembly is connected to a recording assembly; rotating the recording assembly about a rod of a platform assembly; and generating images with a multimedia device connected to the recording.

BRIEF DESCRIPTION OF THE DRAWINGS

The foregoing summary, as well as the following detailed description of the preferred embodiments of the present invention, will be better understood when read in conjunction with the appended drawings, in which:

FIG. 1B is a side view of FIG. 1A;

FIG. 2 is a side view of a platform assembly of the apparatus of the present invention;

FIG. 4 is an exploded view of a leveling assembly of the apparatus of the present invention; and FIG. 5 is an exploded view of a power assembly of the apparatus of the present invention.

DETAILED DESCRIPTION OF SOME EXEMPLIFYING EMBODIMENTS

The following detailed description is now directed to certain specific embodiments of the disclosure. In this description, reference is made to the drawings wherein like parts are designated with like numerals throughout the description and the drawings.

Figure 1A:
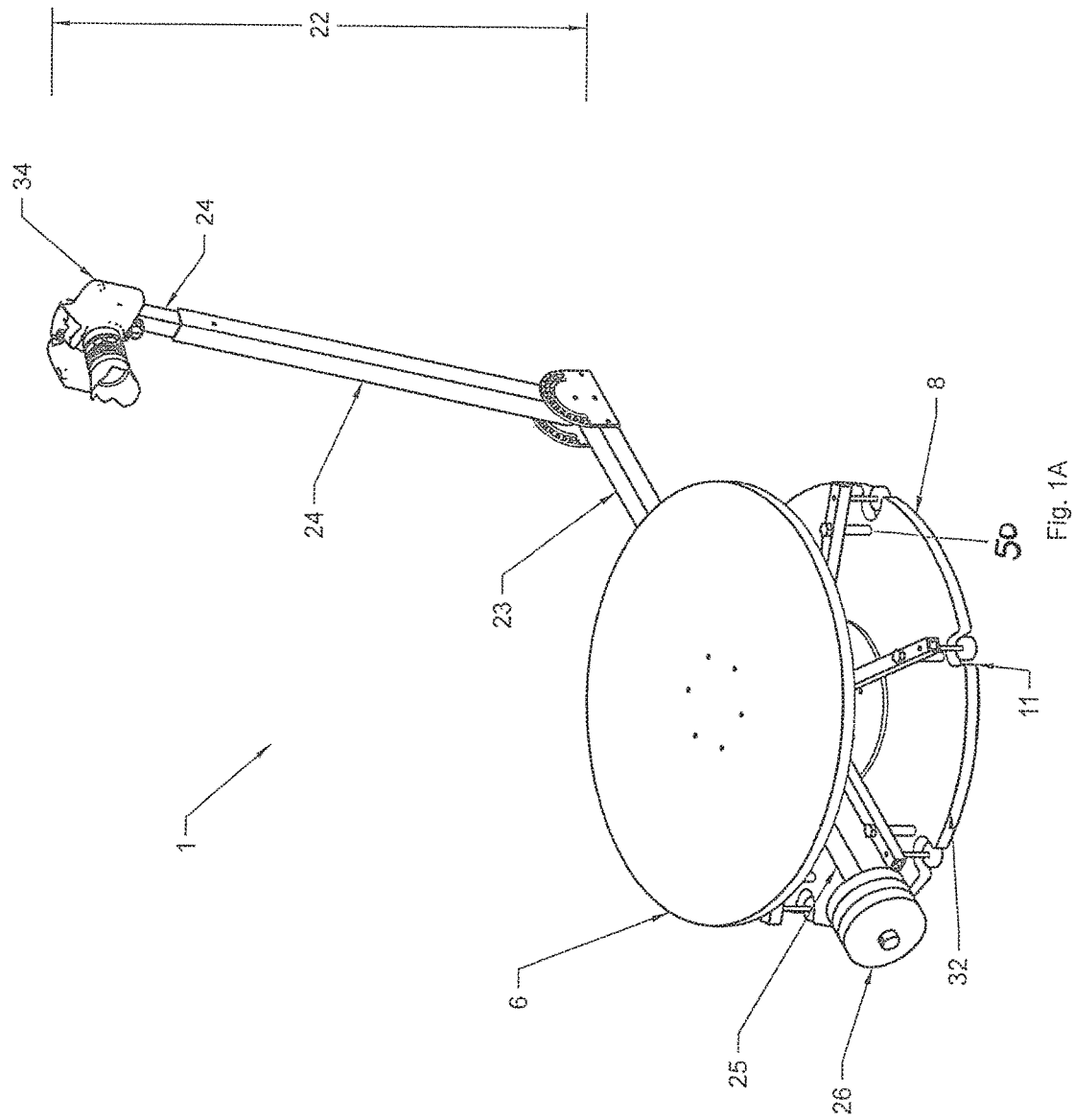
FIG. 1A is an isometric view of an apparatus according to an embodiment of the present invention.

The present invention is directed to an apparatus 1 that can be used to generate and/or record images, such as photos and videos. As shown in FIGS. 1A and 1B, the apparatus can allow a multimedia device 34 to generate and/or record images and video by rotating 360° degrees about a fixed position. The recording assembly 20 can be rotated manually or automatically, as will be explained in more detail below. In an aspect, the recording assembly 20 can be completed isolated mechanically from aspects of the apparatus 1. The apparatus 1 disclosed herein can be portable. The apparatus 1 can comprise a platform assembly 5 and a recording assembly 20 dimensioned and configured to be independent of the platform assembly 5. In an aspect, the recording assembly 20 rotates independently of the platform assembly 5. The apparatus 1 can further comprise a power assembly 40 dimensioned and configured to supply power to the recording assembly 20.

As shown in FIG. 2, the platform assembly 5 can comprise a top plate 6 coupled to a rod 7 that is coupled to a base plate 8. The top plate 6 and the base plate 8 can, independently of one another, be any size and/or shape. In an aspect, both of the top 6 and base 8 plates can be a circular shape. One of ordinary skill in the art would understand that the size and/or the shape can vary without affecting the use of the apparatus 1 so long as a user can be positioned on the top plate 6.

The top 6 and bottom 8 plates can be connected by a vertically oriented rod 7. In an aspect, the rod 7 can be located at a center axis of each of the top 6 and bottom 8 plates. The rod 7 can be hollow or solid. The rod 7 can be made of any material that would support the weight of the top plate 6, a top plate support 9, and at least one of a user, a subject, or an object. Non-limiting examples of suitable material for the rod 7 include steel, wrought iron, cast iron, platinum, silver, copper, brass, gold, tin, bismuth, zinc, antimony, lead, tungsten, titanium, nickel, aluminum, metal alloys, etc. It is envisaged that the rod 7 should be able to withstand a load of up to about 1000 pounds, for example up to about 500 pounds, and as a further example up to about 300 pounds. At a minimum, the rod 7 should be able to withstand a load equivalent to the weight of the top plate 6 and the top plate support 9, for example about 0.5 pounds or greater.

In order to distribute a load, such as a user, more evenly the platform assembly 5 can also have a top plate support 9 and a base plate support 10. The top plate support 9 can be connected to the underside of the top plate 6 and to the rod 7 using any mechanical fastener. The base plate support 10 can be connected to the topside of the base plate 8 and to the rod 7. The top 9 and base 10 plate supports can be connected to the top plate and base plate, respectively, using known mechanical fasteners, such as nails, screws, bolts, pins, welds, etc. In an alternative aspect, the rod 7 can have one or more threaded portions at its ends for coupling to at least one of the top plate 6, top plate support 9, base plate 8, and base plate support 10.

As shown in FIGS. 1A, and 1B the base plate 8 of the platform assembly 5 of the apparatus 1 of the present invention, can comprise a plurality of cutouts 11 along an edge of the based plate 8. The number of cutouts 11 can vary but, in an aspect, can be equal to the number of threaded feet 32 present in a leveling assembly 28. In an aspect, the base plate 8 can have from 2-8 cutouts 11 along its edge, for example 3 cutouts 11, and as a further example 6 cutouts 11 along its edge. In another aspect, the base plate 8 does not have any cutouts 11 along its edge. In yet another aspect, the base plate 8 has cutouts 11 within the surface (not shown) of the base plate 8.

Figure 3:
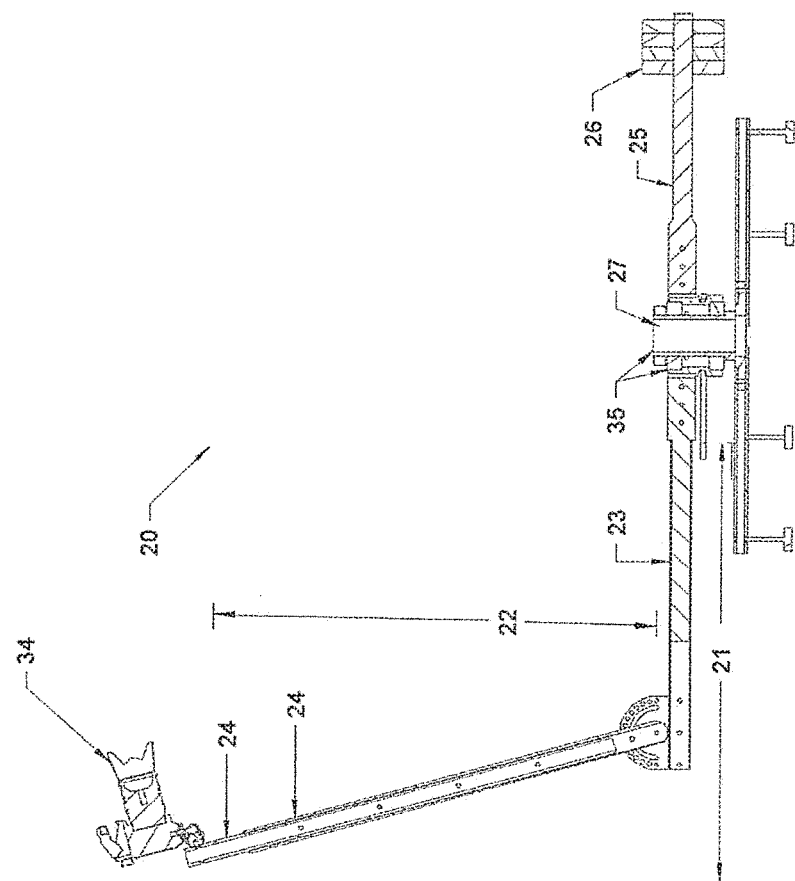
FIG. 3 is a side view of a recording assembly of the apparatus of the present invention.

FIG. 3 illustrates the recording assembly 20 for use in the apparatus 1 of the present invention. The recording assembly 20 can comprise a pivoting arm 21, a balancing arm 25, and a pipe 35 having a bore 27. As shown in FIGS. 1B and 3, in an aspect the pivoting arm 21 can be connected to the pipe 35, and the balancing arm 25 can be connected to the pipe 35 on a side opposite of the pivoting arm 21. The pivoting arm 21 and the balancing arm 25 can be connected to the pipe 35 using any mechanical connection. In an aspect, a triangular arm support can be placed above and below each of the pivoting arm 21 and the balancing arm 25. Mechanical fasteners, such as screws or bolts, could then attach the triangular arm supports to both the pipe 35 and the balancing arm 25 and the pipe 35 and the pivoting arm 21. In an aspect, the pipe 35 can be dimensioned and configured to fit around at least one bearing in order to provide a smooth rotation of the recording assembly 20 about the rod 7 of the platform assembly 5. In an aspect, the pipe 35 is vertical and the at least one bearing is attached to the vertical pipe 35.

The disclosed pivoting arm 21 can comprise a telescoping portion 22 that is pivotally connected to an extension portion 23. As shown in FIG. 3, the extension portion 23 of the pivoting arm 21 extends from the pipe 35 outward. The length of the extension portion 23 should be longer than the radius of the top plate 6, if the top plate is circular, or at least half of the length of the top plate 6 if it is another shape.

In an aspect, the extension portion 23 includes a connection element at the end opposite of the connection to the pipe 35. The connection element is dimensioned and configured to pivotally connect the extension portion 23 to the telescoping portion 22 of the pivoting arm 21. In an aspect, the connection element can comprise a plurality of holes spaced apart and forming a half-circle that begins and ends on a horizontal plane of the extension portion 23. The telescoping portion 22 can be pivotally connected to the extension portion 23 via the connection element or can be directly connected using mechanical fasteners, such as a wing screw fastener and nut combination. One of ordinary skill in the art would appreciate that any mechanical fastener can be used so long as the fastener does not loosen during operation of the apparatus.

The connection element can allow the user to adjust the angle of the telescoping portion 22 with respect the extension portion 23. The angle between the telescoping portion 22 and the extension portion 23 can range from 0° to about 180°, for example from about 20° to about 160°, and as a further example from about 40° to about 140°, including any angle in between.

The telescoping portion 22 of the pivoting arm 21 can comprise one or more segments 24. Similarly, the extension portion 23 of the pivoting arm 21 can comprise one or more segments 24. The one or more segments of each of the telescoping portion 22 and/or the extension portion 23 can be connected together with mechanical fasteners, such as wing screw fasteners and nut combinations or for example a spring button. One of ordinary skill in the art would understand that any mechanical fastener can be used to connect the one or more segments forming the telescoping portion 22 and/or the extension portion 23 so long as the fasteners are allow for the extension and retraction of the segments along their length during set-up and disassembly of the apparatus, but remain fastened during operation of the apparatus.

As shown in FIG. 3, one end of the telescoping portion 22 of the pivoting arm 21 is connected to the extension portion 23. The opposite end of the telescoping portion 22 is dimensioned and configured to receive and support a multimedia device 34. Non-limiting examples of a multimedia device for use in the disclosed invention include a camera, a smart phone, a notebook, an iPad™, a tablet, personal digital assistance, video game, a mobile telephone, a GoPro™, infrared imager, x-ray, any imaging device, or any portable multimedia device that, for example, could record and/or captures a video or still image.

As shown in FIG. 3, the recording assembly 20 also includes a balancing arm 25 that can be coupled to the pipe 35 at one end and can be coupled to one or more counterweights 26 at an opposite end. The number of counterweights 26 used may depend upon the weight of the counterweight 26, as well as the weight of the multimedia device 34 present on the pivoting arm 21. For example, a single weight of one pound could be used. As a further example, three separate weights of 0.25 pounds could be used. One of ordinary skill in the art would readily be able to determine the number and weight of the counterweights 26 to be used by rotating the recording assembly 20 to determine that it rotates freely and independently of the platform assembly 5 without any disruption in the rotation. The one or more counterweights 26 may be held in place on the balancing arm 25 with mechanical fasteners, such as weight bar collars, pins, or bar bell collars, for example.

In another aspect, the balancing arm 25 can also comprise one or more segments in a manner similar to the telescoping portion 22 and the extension portion 21. One of ordinary skill in the art would be able to adjust the distance of the one or more counterweights 26 from the pipe 35 as well as adjusting the mass of the counterweights to maximize the rotation of the recording assembly 20 and minimize any effects due to oscillation.

As shown in FIG. 4, the recording assembly 20 can further comprise a leveling assembly 28. The leveling assembly 28 can provide additional support to the recording assembly 20 so that the multimedia device 34 does not bounce or jiggle when a user steps onto the top plate 6 due to mechanical isolation. The leveling assembly 28 can comprise a spoked wheel 29 having a plurality of spokes 30 and a central bore 31, wherein the central bore 31 encompasses the rod 7 of the platform assembly 5. A leveling segment 33 can attach to each of the plurality of spokes 30 of the spoked wheel 29. For example, a spoked wheel 29 with six spokes 30 would have six leveling segments 33 attached to each spoke. The number of the spokes 30 on the spoked wheel 29 can vary.

Each leveling segment 33 of the leveling assembly 28 can comprise two sets of holes 52a and 52b, as shown in FIG. 4. The first set of holes 52a can be used with a locking mechanism 50. In an aspect, the platform assembly 5 and the leveling assembly 28 can be connected with the locking mechanism 50 (FIGS. 1A, 1B and 4). The first set of holes 52a can extend through the leveling segment 33. The locking mechanism 50 can be inserted through the first set of holes 52a of each leveling segment 33 and into the base plate 8. In an aspect, the locking mechanism 50 can include a cylindrical tube or spacer and a bolt. The cylindrical tube or spacer can be used to keep the leveling segment 33 from moving closer to the base plate 8. The bolts can be used to keep the leveling segment 33 from moving away from the base plate 8.

The locking mechanism 50 can be engaged during the non-use and transport of the apparatus 1. The locking mechanism 50 can be disengaged during use and set-up of the apparatus 1. In another aspect, the locking mechanism 50 can be engaged when the recording assembly 20 is rotating very fast. In this manner, the locking mechanism 50 can secure the leveling assembly 28 to the platform assembly 28 thereby disturbing a load throughout the attached assemblies.

The second set of holes 52b can extend through the leveling segment 33 and a threaded foot 32 can be inserted into the second set of holes 52b of each arm 33. Each threaded foot 32 present on each leveling segment 33 can be independently manipulated to alter the height of each leveling segment 33 of the leveling assembly 28. In this manner, the user can level the apparatus 1 if it is placed onto an uneven surface. Each threaded foot 32 can be positioned in each of the plurality of cutouts 11 of the base plate 8. In an alternative aspect, each threaded foot 32 can be positioned outside the diameter of the base plate 8. In a further aspect, each threaded foot 32 can be positioned within a cutout that is wholly within the surface of the base plate 8.

As shown in FIGS. 1A and 5, the apparatus 1 can further comprise a power assembly 40. The power assembly 40 can comprise at least one of a pulley 41, a belt 44, a power source 42, and a drive mechanism 43. The belt 44 extends around a base of the pipe 35 of the recording assembly 20 and around the pulley 41. The pulley 41 can be connected to the drive mechanism 43. The drive mechanism 43 can be connected to the power source 42.

The power source 42 can power a main system control and drive mechanism. Non-limiting examples of the power source 42 include an AC power device (power can be supplied by a wall outlet or generator), a DC power device (power can be supplied by a battery), a hand powered device, and/or a mechanical spring (release of kinetic energy).

The power source 42 can be wired to a main systems control unit (not shown) that can control all the actions of the apparatus 1 input by a user. For example, the main systems control can control the rotation of the recording assembly 20, the direction of rotation, the speed of rotation (for example from time lapse (0.001 rpm) to high FPS (180 rpm)), rotation time, brake actuation, and any secondary controls.

The main systems control can be wired to the drive mechanism 43. Non-limiting examples of the drive mechanism 43 include a motor, a spring, and a brake. The motor may be adjustable to correct tension on the belt 44.

The main systems control can also be connected to a user interface (not shown), such as a smartphone application or a controller. The connection may be wired, Bluetooth, radio frequency, WiFi, LiFi, and/or infrared, etc. The user interface can allow the user to communicate with the main systems control.

In an aspect, the recording assembly 20 can also include a secondary power source, such as a battery, and secondary controls. The secondary controls can be connected to the main systems controls by at least one of Bluetooth, radio frequency, infrared, or other wireless communication. The secondary power source can be wired to the secondary controls. The secondary controls can perform at least the following functions: power on/off; adjust the speed, acceleration, and direction; pan the multimedia device 34 up/down; slide the multimedia device 34 up/down; and adjust the intensity (lights).

Although the inventions have been disclosed in the context of a certain preferred embodiments and examples, it will be understood by those skilled in the art that the present inventions extend beyond the specifically disclosed embodiments to other alternative embodiments and/or uses of the inventions and obvious modifications and equivalents thereof. In addition, while a number of variations of the inventions have been shown and described in detail, other modifications, which are within the scope of the inventions, will be readily apparent to those of skill in the art based upon this disclosure. It can be also contemplated that various combinations or subcombinations of the specific features and aspects of the embodiments may be made and still fall within the scope of the inventions. For example, in some embodiments, the features, configurations, or other details disclosed or incorporated by reference herein with respect to some of the connection embodiments are combinable with other features, configurations, or details disclosed herein with respect to other connector embodiments to form new embodiments not explicitly disclosed herein. All of such embodiments having combinations of features and configurations are contemplated as being part of this disclosure. Additionally, unless otherwise stated, no features or details of any of the connector embodiments disclosed herein are meant to be required or essential to any of the embodiments disclosed herein, unless explicitly described herein as being required or essential.

Accordingly, it should be understood that various features and aspects of the disclosed embodiments can be combined with or substituted for one another in order to form varying modes of the disclosed inventions. Thus, it can be intended that the scope of the present inventions herein disclosed should not be limited by the particular disclosed embodiments described above.

What is claimed is:

1. An apparatus, comprising:
   a platform assembly having a top plate coupled to a rod coupled to a base plate; and
   a recording assembly having a leveling assembly, a pivoting arm, a balancing arm, and pipe having a bore;
   wherein the pivoting arm is connected to the pipe, and the balancing arm is connected to the pipe opposite the pivoting arm;
   wherein the recording assembly is independent of the platform assembly; and
   wherein the leveling assembly comprises a spoked wheel having a plurality of teeth and a central bore, wherein the central bore of the spoked wheel encompasses the rod of the platform assembly.

2. The apparatus of claim 1, wherein the platform assembly further comprises a top plate support and a base plate support.

3. The apparatus of claim 2, wherein the top plate is coupled to the top plate support.

4. The apparatus of claim 2, wherein the base plate is coupled to the base plate support.

5. The apparatus of claim 1, wherein the base plate has a plurality of cutouts along an edge.

6. The apparatus of claim 1, wherein the pivoting arm comprises a telescoping portion that is pivotally connected to an extension portion.

7. The apparatus of claim 6, wherein the telescoping portion comprises one or more segments.

8. The apparatus of claim 6, wherein the extension portion comprises one or more segments.

9. The apparatus of claim 1, wherein the balancing arm comprises one or more counterweights.

10. The apparatus of claim 1, wherein a leveling segment attaches to each tooth of the gear.

11. The apparatus of claim 1, wherein the leveling segment has a threaded foot.

12. The apparatus of claim 11, wherein the threaded foot is positioned in each of the plurality of cutouts of the base plate.

13. The apparatus of claim 1, further comprising a power assembly.

14. The apparatus of claim 13, wherein the power assembly comprises at least one of a pulley, a power source, and a drive mechanism.

15. A method for capturing an image, comprising:
providing power to a power assembly comprising at least one of a power source, a drive mechanism, a pulley, and a belt; wherein the power assembly is connected to a recording assembly;
rotating the recording assembly about a rod of a platform assembly;
leveling the recording assembly, wherein the leveling assembly comprises a spoked wheel having a plurality of teeth and a central bore, wherein the central bore of the spoked wheel encompasses the rod of the platform assembly and
generating images with a multimedia device connected to the recording assembly.

16. The method of claim 15, wherein the platform assembly has a top plate coupled to the rod coupled to a base plate.

17. The method of claim 15, wherein the recording assembly has a pivoting arm, a balancing arm, and a pipe having a bore, wherein the pivoting arm is connected to the pipe, and the balancing arm is connected to the pipe opposite the pivoting arm.

18. The method of claim 17, further comprising adjusting at least one of a length and an angle of the pivoting arm; and adjusting at least one of a length and mass of the balancing arm.

* * * * *